(12) United States Patent
Hamlyn

(10) Patent No.: US 8,057,618 B2
(45) Date of Patent: Nov. 15, 2011

(54) METHOD AND APPARATUS FOR MAKING STRUCTURES OF COMPOSITE MATERIAL, IN PARTICULAR AIRPLANE FUSELAGE SECTIONS

(75) Inventor: Alexander Hamlyn, Ploemeur (FR)

(73) Assignee: Coriolis Composites, Lyons (FR)

( * ) Notice: Subject to any disclaimer, the term of this patent is extended or adjusted under 35 U.S.C. 154(b) by 665 days.

(21) Appl. No.: 11/740,057

(22) Filed: Apr. 25, 2007

(65) Prior Publication Data

US 2008/0196825 A1    Aug. 21, 2008

(30) Foreign Application Priority Data

Feb. 21, 2007   (FR) ...................................... 07 01241

(51) Int. Cl.
*B65H 81/00*   (2006.01)
*B64C 1/00*   (2006.01)

(52) U.S. Cl. ........ 156/189; 156/196; 156/245; 244/119; 244/126

(58) Field of Classification Search .................. 156/189, 156/425, 428, 429, 430, 431, 432, 190, 191, 156/195, 173, 180, 433, 574, 577, 523, 576, 156/212; 244/119, 120, 126; *B29C 67/14, B29C 53/66, 53/72; B29K 105/10; B29L 22/00*
See application file for complete search history.

(56) References Cited

U.S. PATENT DOCUMENTS

| | | |
|---|---|---|
| 494,910 A | 4/1893 | Wells |
| 1,100,829 A | 6/1914 | Joseph |
| 1,164,303 A | 12/1915 | Nicewarner |
| 1,301,354 A | 4/1919 | Baird |
| 3,206,429 A | 9/1965 | Broyles et al. |
| 3,238,084 A | 3/1966 | Hawkins |
| 3,265,795 A | 8/1966 | Medney |
| 3,300,355 A | 1/1967 | Adams |
| 3,563,122 A | 2/1971 | De Neui |
| 3,662,821 A | 5/1972 | Saxon |
| 3,713,572 A | 1/1973 | Goldsworthy et al. |
| 3,856,052 A | 12/1974 | Feucht |

(Continued)

FOREIGN PATENT DOCUMENTS

DE     1 922 327 U     8/1965

(Continued)

OTHER PUBLICATIONS

File History for U.S. Appl. No. 11/666,537, filed Nov. 26, 2008.

(Continued)

*Primary Examiner* — Philip Tucker
*Assistant Examiner* — William Bell
(74) *Attorney, Agent, or Firm* — Patterson Thuente Christensen Pedersen, P.A.

(57) ABSTRACT

A method and a device for manufacturing hollow components out of a composite material, such as sections of an airplane fuselage, that include a skin and possibly strengthening elements. The method may include inserting a multi-articulated arm fitted with a fiber placement head inside a female mold of elongated shape. The female mold includes a longitudinal slit. A support for the multi-articulated arm is received through the slit. The method may also include applying fibers to the inner molding surface of the female mold using the placement head to form the composite material skin, by displacement of the application head using the multi-articulated arm and relative displacement in translation of the support for the multi-articulated arm along said longitudinal slit.

22 Claims, 5 Drawing Sheets

U.S. PATENT DOCUMENTS

| | | | |
|---|---|---|---|
| 4,118,814 A | 10/1978 | Holtom | |
| 4,242,160 A | 12/1980 | Pinter et al. | |
| 4,351,688 A | 9/1982 | Weiss et al. | |
| 4,461,669 A | 7/1984 | Dontscheff | |
| 4,488,466 A | 12/1984 | Jones | |
| 4,562,033 A * | 12/1985 | Johnson et al. | 264/510 |
| 4,569,716 A | 2/1986 | Pugh | |
| 4,574,029 A * | 3/1986 | Murray | 156/500 |
| 4,699,031 A | 10/1987 | D'Angelo et al. | |
| 4,717,330 A * | 1/1988 | Sarh | 425/403 |
| 4,735,672 A | 4/1988 | Blad | |
| 4,849,150 A | 7/1989 | Kittaka et al. | |
| 4,976,012 A | 12/1990 | McConnell | |
| 4,990,213 A | 2/1991 | Brown et al. | |
| 4,992,133 A | 2/1991 | Border | |
| 4,997,513 A | 3/1991 | Lengen et al. | |
| 5,078,592 A | 1/1992 | Grimshaw et al. | |
| 5,087,187 A * | 2/1992 | Simkulak et al. | 425/112 |
| 5,110,395 A | 5/1992 | Vaniglia | |
| 5,290,389 A | 3/1994 | Shupe et al. | |
| 5,447,586 A | 9/1995 | Tam | |
| 5,700,347 A | 12/1997 | McCowin | |
| 6,026,883 A | 2/2000 | Hegerhorst et al. | |
| 6,073,670 A | 6/2000 | Koury | |
| 6,251,185 B1 | 6/2001 | Morrison et al. | |
| 6,256,889 B1 | 7/2001 | Zuro | |
| 6,451,152 B1 | 9/2002 | Holmes et al. | |
| 6,458,309 B1 * | 10/2002 | Allen et al. | 264/319 |
| 6,490,990 B1 | 12/2002 | Hamlyn et al. | |
| 6,540,000 B1 | 4/2003 | Darrieux et al. | |
| 6,605,171 B1 | 8/2003 | Debalme et al. | |
| 7,048,024 B2 | 5/2006 | Clark et al. | |
| 7,819,160 B2 | 10/2010 | Hamlyn et al. | |
| 7,926,537 B2 | 4/2011 | Hamlyn et al. | |
| 2002/0014715 A1 | 2/2002 | Wirth et al. | |
| 2002/0090408 A1 | 7/2002 | Dahl et al. | |
| 2002/0152860 A1 | 10/2002 | Machamer | |
| 2003/0118681 A1 | 6/2003 | Dahl et al. | |
| 2004/0031879 A1 * | 2/2004 | Kay et al. | 244/17.11 |
| 2004/0079838 A1 | 4/2004 | Simpson et al. | |
| 2004/0103948 A1 | 6/2004 | Scheelen et al. | |
| 2005/0023414 A1 | 2/2005 | Braun | |
| 2005/0037195 A1 | 2/2005 | Warek | |
| 2005/0039844 A1 | 2/2005 | Engwall et al. | |
| 2005/0061422 A1 | 3/2005 | Martin | |
| 2005/0236735 A1 | 10/2005 | Oldani et al. | |
| 2006/0162143 A1 | 7/2006 | Nelson et al. | |
| 2006/0169118 A1 | 8/2006 | Morehead | |
| 2006/0180264 A1 * | 8/2006 | Kisch et al. | 156/173 |
| 2006/0231682 A1 * | 10/2006 | Sarh | 244/119 |
| 2007/0044919 A1 * | 3/2007 | Hoffmann | 156/430 |
| 2007/0044922 A1 | 3/2007 | Mischler et al. | |
| 2008/0093026 A1 | 4/2008 | Naumann | |
| 2008/0105785 A1 * | 5/2008 | Griess et al. | 244/120 |
| 2008/0157437 A1 | 7/2008 | Nelson et al. | |
| 2008/0202691 A1 | 8/2008 | Hamlyn et al. | |
| 2008/0216961 A1 | 9/2008 | Hamlyn et al. | |
| 2008/0216963 A1 | 9/2008 | Hamlyn et al. | |
| 2009/0229760 A1 | 9/2009 | Hamlyn et al. | |
| 2009/0311506 A1 | 12/2009 | Herbeck et al. | |
| 2010/0252183 A1 | 10/2010 | Munaux et al. | |
| 2011/0011537 A1 | 1/2011 | Hamlyn et al. | |
| 2011/0011538 A1 | 1/2011 | Hamlyn et al. | |

FOREIGN PATENT DOCUMENTS

| | | |
|---|---|---|
| DE | 37 43 485 A1 | 7/1989 |
| DE | 10 2007 009 124 A1 | 8/2008 |
| EP | 0 216 695 A1 | 4/1987 |
| EP | 0 241 251 A1 | 10/1987 |
| EP | 0 557 158 A1 | 8/1993 |
| EP | 0 626 252 B1 | 11/1994 |
| EP | 0 753 394 A2 | 1/1997 |
| EP | 0 773 099 A1 | 5/1997 |
| EP | 1 001 066 A2 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 A1 | 6/1989 |
| FR | 2 686 080 A1 | 7/1993 |
| FR | 2 721 548 A1 | 12/1995 |
| FR | 2 784 930 A1 | 4/2000 |
| FR | 2 865 156 A1 | 7/2005 |
| FR | 2 882 681 A1 | 9/2006 |
| FR | 2 913 365 A1 | 9/2008 |
| GB | 2 268 705 A | 1/1994 |
| GB | 2 270 672 A | 3/1994 |
| GB | 2 292 365 A | 2/1996 |
| JP | 01281247 | 11/1989 |
| JP | 2005-007252 | 1/2005 |
| JP | 2005329593 | 12/2005 |
| WO | WO 95/20104 | 7/1995 |
| WO | WO 02/070232 A1 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO 2008/149004 A1 | 12/2008 |
| WO | WO 2010/049424 A1 | 5/2010 |

OTHER PUBLICATIONS

File History for U.S. Appl. No. 11/740,055, filed Apr. 25, 2007.
File History for U.S. Appl. No. 11/740,060, filed Apr. 25, 2007.
File History for U.S. Appl. No. 11/740,064, filed Apr. 25, 2007.
Transaction History for U.S. Patent No. 6,490,990, Issued Dec. 10, 2002.
File History for U.S. Appl. No. 12/434,253, filed May 1, 2009.
File History for U.S. Appl. No. 12/628,460, filed Dec. 1, 2009.
File History for U.S. Appl. No. 12/628,449, filed Dec. 1, 2009.
French Search Report dated Apr. 13, 2010 for French Application No. 09 54963.
French Search Report dated Apr. 15, 2010 for French Application No. 09 54964.
International Search Report for International Application No. PCT/EP2010/054377 dated Jul. 2, 2010.
Application and File History for U.S. Appl. No. 11/740,055, filed Apr. 25, 2007, inventor Hamlyn.
Application and File History for U.S. Appl. No. 11/740,060, filed Apr. 25, 2007, inventor Hamlyn.
Application and File History for U.S. Appl. No. 11/740,064, filed Apr. 25, 2007, inventor Hamlyn.
Application and File History for U.S. Appl. No. 12/434,253, filed May 1, 2009, inventor Munaux.
Application and File History for U.S. Appl. No. 12/628,449, filed Dec. 1, 2009, inventor Hamlyn.
Application and File History for U.S. Appl. No. 12/628,460, filed Dec. 1, 2009, inventor Hamlyn.
Application and File History for U.S. Appl. No. 11/666,537, filed Nov. 26, 2008, inventor Hamlyn.
Application and File History for U.S. Appl. No. 12/628,460, filed on Dec. 1, 2009, inventor Hamlyn.

* cited by examiner

METHOD AND APPARATUS FOR MAKING STRUCTURES OF COMPOSITE MATERIAL, IN PARTICULAR AIRPLANE FUSELAGE SECTIONS

RELATED APPLICATION

The present application claims priority to French Application No. 0701241 filed Feb. 21, 2007, which is incorporated herein in its entirety by reference.

FIELD OF THE INVENTION

The present invention relates to a method and a device for manufacturing hollow components out of a composite material, that include a skin, and possibly strengthening elements, and in particular the manufacture of hollow components such as sections of airplane fuselage.

BACKGROUND OF THE INVENTION

Airplane fuselage is conventionally made by assembling fuselage portions of generally cylindrical shape, each portion including a coating or skin and strengthening elements such as stringers, frames, and specific local strengtheners for the subsequent assembly of the wings, cockpit, and landing gear for example.

To limit their weight while guaranteeing good mechanical properties, a proposal has been made for sections made out of composite materials formed of long fibers embedded in a resin matrix, particularly carbon fibers embedded in a thermosetting resin matrix. The composite material skin is conventionally obtained by draping fibers impregnated with unhardened or crude resin over the outer surface of a tool constituted by a rotating male mandrel. The fibers are applied in the form of a strip using a fiber placement head associated with a cartesian displacement system installed around the mandrel. This crude skin, with fibers impregnated with unhardened resin, is then polymerized or hardened in an autoclave oven. The strengthening elements of composite material are manufactured separately from fibers pre-impregnated with resin, then are placed in recesses of the mandrel prior to making the skin by fiber placement. The skin and the strengthening elements in their crude state are then hardened together in the autoclave. The sections thus obtained are of the closed type, with a skin that has, in transverse cross-section, a closed contour extending over 360°.

A manufacturing method of this kind, with a rotating tool, proves particularly tricky to implement. It requires implementation means that are heavy, cumbersome and complex, since the rotated mandrel has to be sufficiently rigid to stop it from bending or to limit its bending.

Furthermore, to obtain a clean outer surface condition, counter-forms, also known as formers, have to be applied against the outer surface of the crude skin for its hardening in the autoclave. These formers with their holding system are long and tedious to install, and increase the weight and volume of the assembly which has to go into the autoclave.

To avoid using formers, U.S. Pat. No. 7,048,024 proposed to make the skin of the sections by applying fibers to the inner surface of a rotating hollow mandrel. The method described only allows the manufacture of the skin of a section, without strengthening elements, and is also based on a rotating tool.

SUMMARY OF THE INVENTION

The purpose of the present invention is to overcome the aforementioned drawbacks by proposing a method for manufacturing hollow components, particularly sections of airplane fuselage, which is simple to implement.

To this end, the present invention proposes a method for manufacturing hollow components out of a composite material, that include a skin, and possibly strengthening elements, said method comprising:

a) inserting a multi-articulated arm fitted with a fiber placement head inside a female mold of elongated shape, said female mold being open via a longitudinal slit intended to receive the support means of said multi-articulated arm, b) applying fibers, preferably fibers impregnated with resin, to the inner molding surface of the female mold using the fiber placement head to form said composite material skin, said application step being performed by displacement of the application head using the multi-articulated arm and relative displacement in translation of said support means of the multi-articulated arm along said longitudinal slit of the female mold.

According to the invention, the hollow components of composite material are manufactured using a female mold of elongated shape that has a longitudinal slit to allow the displacement of the multi-articulated arm carrying a fiber placement head when making the composite material skin. The method according to the invention allows large dimension hollow components to be made, without a rotating tool.

The female mold has an annular transverse cross-section, the longitudinal slit constitutes a narrow opening that has in transverse cross-section a small dimension relative to the contour of the inner molding surface in cross-section. The female mold may have any type of concave inner surface, with a constant or non-constant transverse cross-section, with or without a longitudinal plane of symmetry. The inner surface is in particular cylindrical and/or truncated cone shaped overall, although concave inner surfaces that include angles between two adjacent plane parts may also be used.

The method according to the invention allows hollow, open, components to be manufactured, that have a narrow longitudinal opening corresponding to the longitudinal slit of the female mold. A hollow component of closed transverse cross-section may easily be made by coupling to the open hollow component obtained a complementary component that has a shape complementary to that of the longitudinal opening. The application step preferably includes the application of fibers impregnated with resin. As a variant, the method includes a dry fiber application step followed by a step of injecting or infusing resin into the dry fibers placed on the female mold.

According to one embodiment, the support means include at least one linear rail for the support and displacement of the multi-articulated arm, and the application step b) is performed on a stationary female mold, by displacement of the multi-articulated arm along the linear rail received in the longitudinal slit of the female mold, said linear rail rests preferably on the ground and the female mold is placed over said rail and rests on the ground on either side of the longitudinal slit.

According to one embodiment, the female mold includes at least one open end where said longitudinal slit emerges, the multi-articulated arm being inserted in step a) through said open end by a relative displacement in longitudinal translation of the support means relative to the female mold.

The method according to the invention may to advantage be applied for making hollow components such as sections of airplane fuselage, that include a skin of overall cylindrical and/or truncated cone shaped cross-section, with at least one longitudinal plane of symmetry. The open hollow components resulting from the method described above constitute open fuselage sections which will subsequently be closed through the assembly of one or more complementary components of composite material complementary in shape to that of the longitudinal openings of the open sections so as to form closed sections. In the case of an airplane fuselage section, said complementary components will constitute to advantage the upper, so-called roof part of the airplane fuselage. This roof part is in fact not much acted upon, and therefore requires few strengthening elements or may be different in structure, for example of a sandwich structure.

Open hollow components of the fuselage section type may also be used to make boat hulls, submarines, space launchers or tanks for example.

According to one embodiment of hollow components of the airplane fuselage section type, the fiber application step b) in order to form the composite material skin is followed by the following steps:

c) installing strengthening elements made out of a composite material in its crude state, inside the female mold, against the skin, such as stringers, frames, and local strengtheners, d) simultaneous hardening of the skin and strengthening elements for example by putting them in the autoclave oven, and e) demolding the hollow component of composite material.

To obtain a skin that also has a clean internal surface condition, the method can also include after step c), installing of a male counter-form inside the female mold, against the composite material skin and strengthening elements, this male counter-form being held in place during the hardening step d).

According to one embodiment, the female mold is rigid and the male counter-form is flexible, for example formed of sheet metal in at least two parts that gradually overlap each other, to enable it to be inserted into the female mold in a retracted position and then to be flattened out in a deployed position against the skin.

As a variant, the female mold according to the invention is formed of a flexible female counter-form which is rigidified in a retracted state using stiffeners for the fiber application step. After the have been applied, the stiffeners will be removed to allow it to be fitted onto a rigid male mold.

According to one embodiment, the method includes a step of coupling to the skin a complementary component made out of a composite material, in one or more parts, complementary in shape to that of the longitudinal opening of the skin, so as to form a hollow component of closed transverse cross-section.

In one embodiment, said complementary component is coupled to the hardened skin, after the hardening step d), and possibly after the demolding step e).

In another embodiment, the method includes after step c) positioning a complementary component in its crude state at the longitudinal slit of the female mold, said complementary component being hardened and coupled with the skin during the hardening step d) so as to obtain a closed hollow component.

Another purpose of the present invention is a method for manufacturing airplane fuselage, characterized in that it includes the manufacture of at least two open sections of airplane fuselage as described previously, and the assembly of one or more complementary components of composite material to form closed sections extending over 360°, said complementary components forming the upper part of the fuselage, said complementary components preferably being assembled after the assembly of the open sections via their open ends. This assembly of open sections allows any play between the sections to be easily taken up thereby proving easier to achieve than an assembly of closed sections.

Another objective of the present invention is a device for implementing the methods described previously, characterized in that it includes a multi-articulated arm fitted with a fiber placement head and preferably mounted mobile on at least one linear rail carried on the ground, a female mold including at least one open end and one longitudinal slit emerging on said open end, and holding means able to hold said female mold in a stationary way over said rail in support on the ground over substantially the whole of its length on either side of said rail, such that said multi-articulated arm is able to be displaced inside the mold returning through its open end, said holding means being for example formed by two sole plates of said mold engaged on guide rails anchored to the ground.

BRIEF DESCRIPTION OF THE DRAWINGS

The invention will be better understood, and other purposes, details, characteristics and advantages will emerge more clearly during the following detailed explanatory description of one particular currently preferred embodiment of the invention, with reference to the appended drawings in which.

The figures show a method and a device according to the invention for manufacturing out of a composite material a section of airplane fuselage that includes a skin and strengthening elements. Clearly, the invention may be applied to the manufacture of any hollow component made out of a composite material as described previously.

DETAILED DESCRIPTION OF THE DRAWINGS

Figure 1:
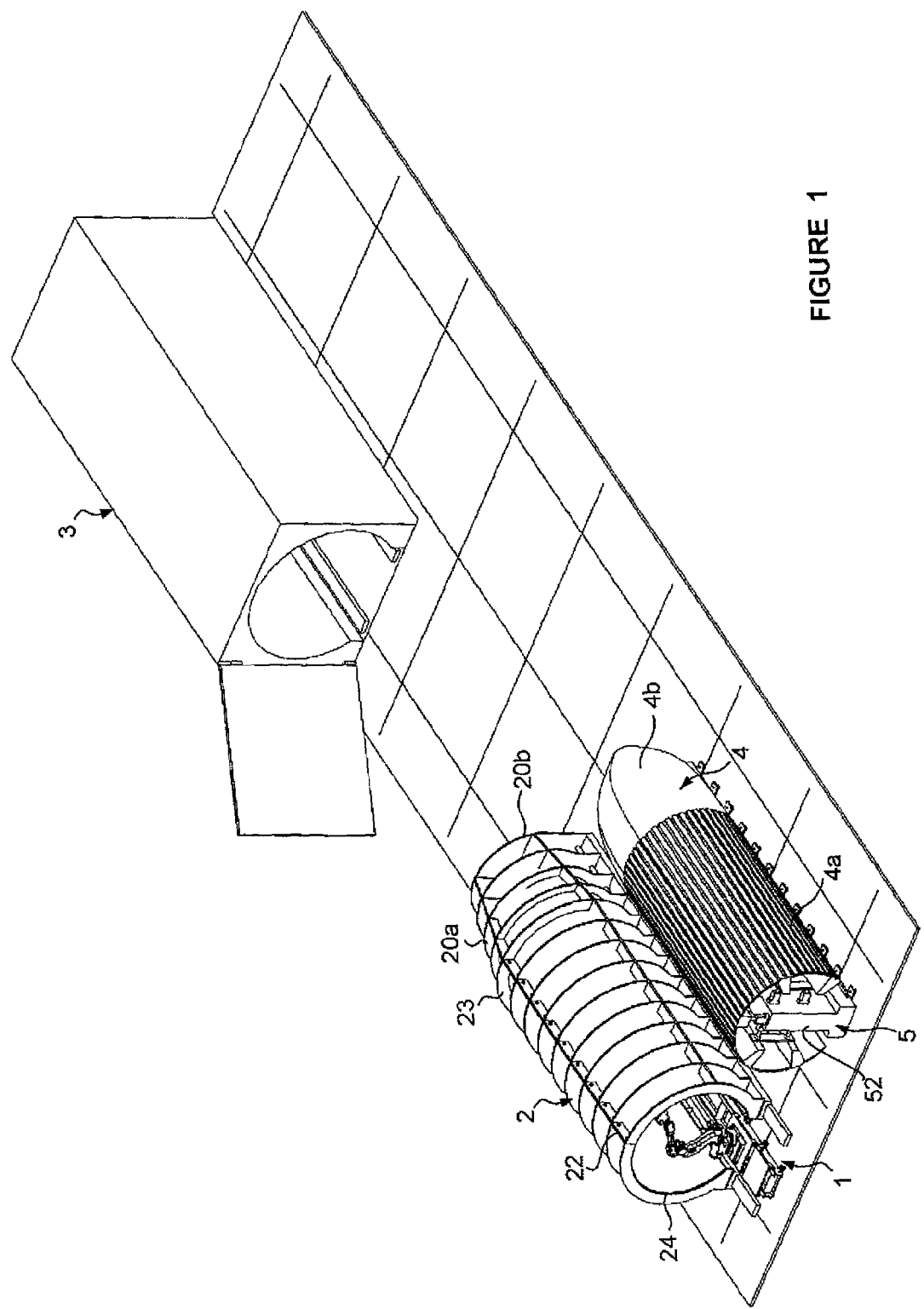
FIG. 1 shows a diagrammatic perspective view of a device for manufacturing hollow components out of a composite material according to the invention, showing the fiber placement system, the female mold, the system for applying a counter-form and the autoclave.
Figure 2:
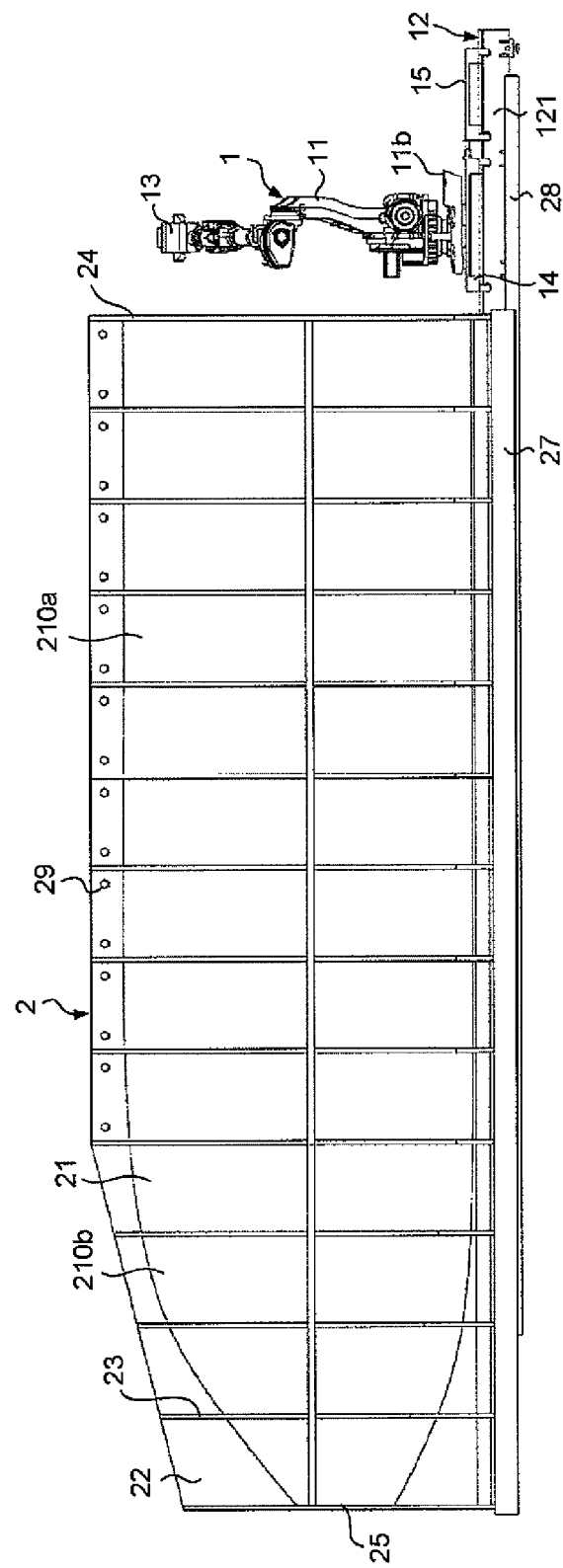
FIG. 2 a side view of the female mold and placement system in FIG. 1, prior to the entry of the robot into the female mold.
Figure 3:
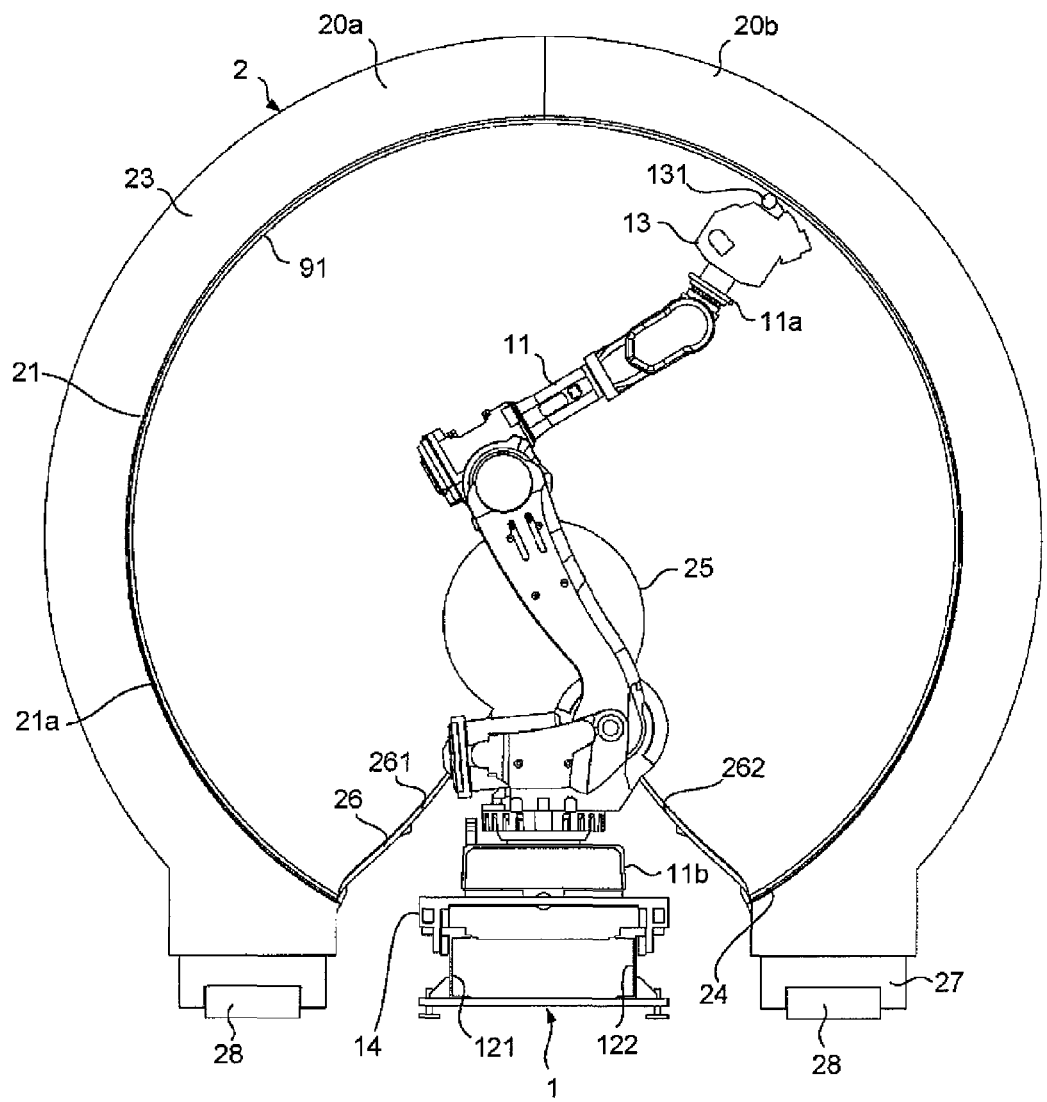
FIG. 3 a front view of the female mold and fiber placement system during the application of fibers to the inner surface of the stationary female mold.

With reference to FIGS. 1 to 3, the device according to the invention includes a fiber placement system 1 and a female mold 2, as well as an autoclave oven 3 and an application system 5 for a counter-form 4. The female mold 2 has an inner molding surface 21a the shape of which corresponds to that of the skin of the section it is required to make. The inner surface is formed by the inner surface of a substantially continuous wall 21, constituted by one or more metal sheets or made out of a composite material, this wall being fitted externally with longitudinal 22 and transverse 23 strengtheners to rigidify the female mold. In this embodiment, the female mold is intended for the manufacture of the front section of an airplane fuselage which includes the cockpit part. The inner molding surface 21a has a so-called rear part 210a, that is of substantially constant transverse cross-section, generally cylindrical in shape, this front part starting from the rear open and overall circular end 24 of the mold, and extending via a second so-called front part 210b, that is of non-constant transverse cross-section, which gets smaller in the direction of the front end 25 of the mold. In this example, the front end 210b is truncated cone shaped, with an open front end 25 of generally circular shape, of radius lower than the rear open end 24. By way of example, the radius of the rear end 24 is of the order of 2 m.

The female mold has a longitudinal slit 26 extending over the whole length of the mold, from the rear end 24 to the front end 25, to enable the female mold to be positioned over the fiber placement system 1 as described below.

The fiber placement system includes a multi-articulated arm 11, of the six axis robot type, known per se, mounted mobile on a linear axis 12, and the end wrist 11a of which is fitted with a fiber placement head 13. The multi-articulated arm displaces the fiber head in all directions. The fiber placement head includes in a known way an application roller 131 able to come into contact with the mold so as to apply a strip formed of several fibers pre-impregnated with resin. The multi-articulated arm is anchored by its base plate 11b on a carriage 14 mounted to slide on the linear axis 12, said linear axis being constituted by two parallel rails 121, 122 fixed to the ground. The carriage is fitted with drive means, for example of the motor-driven roller type automatically controlled by a control unit for the displacement of the placement head along these rails. The fibers can be stored on a bobbin on a creel (not shown) and conveyed individually to the application head via flexible conveying tubes, as described in PCT publication W02006/092514, hereby incorporated by reference in its entirety. Furthermore, one or more tension limiting systems as described in this patent document may be provided between the creel and the application head in order to reduce the tension of the fibers at the roller. The creel is also mounted on a following carriage 15, mounted on the rails 121, 122, and for example connected mechanically to the carriage 14 carrying the robot.

The longitudinal slit 26 of the mold extends over an angular sector sufficient to enable the rails to be positioned between the two opposite longitudinal edges 261, 262 of said longitudinal slit. The longitudinal slit extends transversely over a small angular sector relative to the angular sector over which the inner molding surface extends. The inner molding surface therefore extends transversely over an angular sector of more than 180°, preferably more than 270°, for example of the order of 300°, as shown in the figures.

The female mold includes two longitudinal sole plates 27 arranged on either side of the longitudinal slit, by which the mold is supported on the ground on each side of the rails. As shown in the figures, the sole plates rest to advantage on guide rails 28 arranged on either side of the linear axis 12. As a variant, the female mold is fitted with its own displacement system, each sole plate being for example mounted on an autonomous motor-driven carriage controlled by a radio, laser or vision guide and positioning system. The mold rests on the ground over its entire length, which guarantees mold stability and rigidity during the fiber application operations.

To make the skin 91 of the fuselage section, the female mold is brought over the rails 121, 122 of the fiber placement system by displacing the female mold on the guide rails. The female mold is then immobilized for the fiber application operations. The skin is made by displacing the application head using the multi-articulated arm 11 and displacing the multi-articulated arm on the rails 121, 122, along the longitudinal slit of the female mold, the robot being inserted into the mold through the rear open end of the female mold. Once the crude skin has been made, the female mold may be transferred into an autoclave oven 3 (FIG. 1) for hardening by polymerization and/or pressurized reticulation of the skin. The female mold is then removed from the autoclave oven, and the hardened skin is demolded. To do this, the female mold is made in two symmetrical half-molds 20a, 20b coupled to each other by their upper part using bolts 29. A bond is to advantage positioned at the junction interface of the two half-molds in particular to guarantee the seal during the vacuum forming operation described below.

To advantage, strengthening elements made out of a composite material are placed against the inner surface of the skin to be hardened in the autoclave oven with the skin. In this embodiment, longitudinal sections, usually called stringers, are placed against the inner surface of the skin, over substantially the whole of its length. As can be seen better in FIG. 6, the stringers 92 are of omega-shaped transverse cross-section and are placed on the skin 91 by inserting a core 93, of silicone for example, which will be removed after the hardening operation. Clearly, other types of strengthening elements not shown may be provided, particularly local strengtheners for the front landing gear, the cockpit and the side porthole windows for example.

Figure 4:
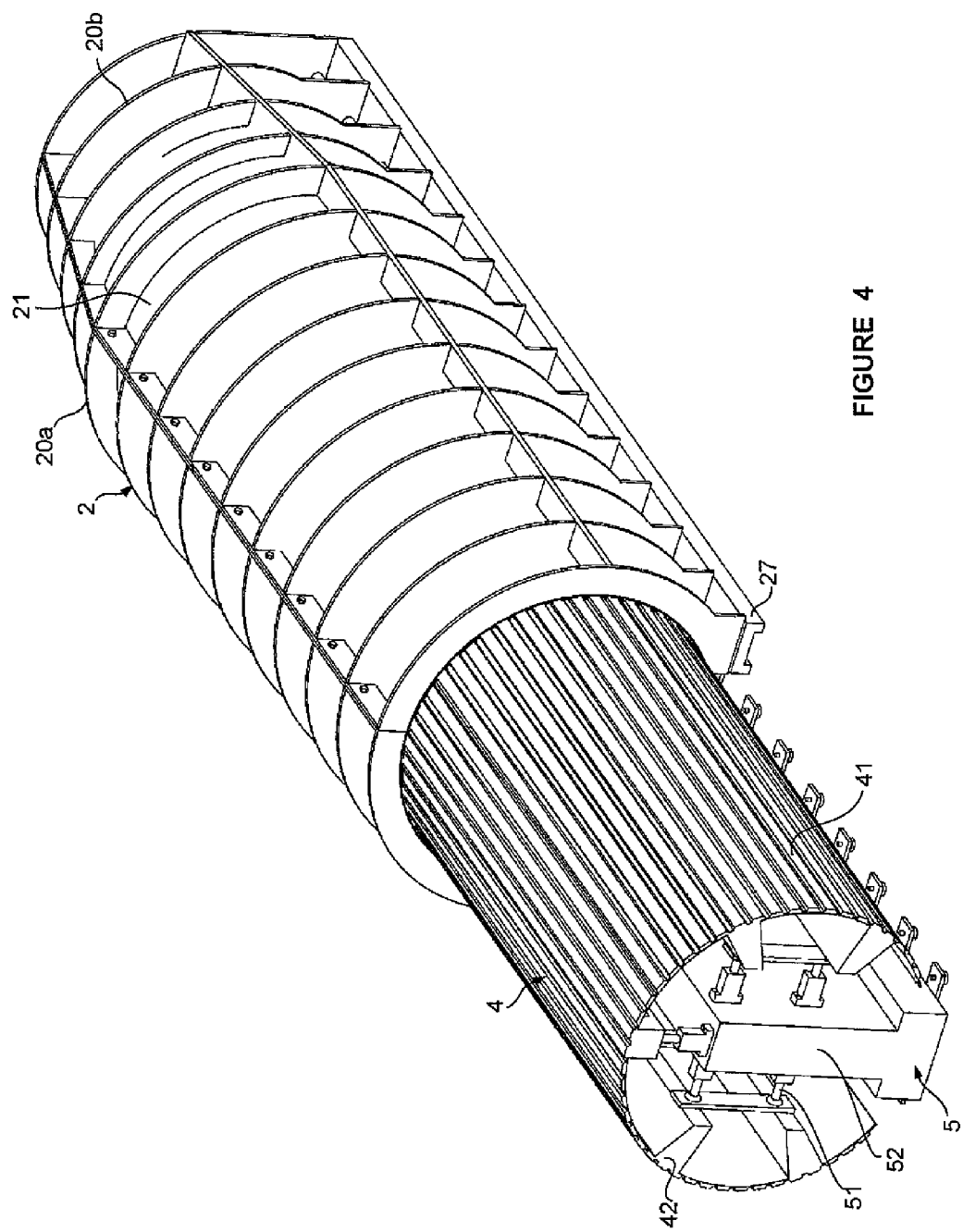
FIG. 4 shows a perspective view of the female mold during its positioning on the counter-form application system.
Figure 5:
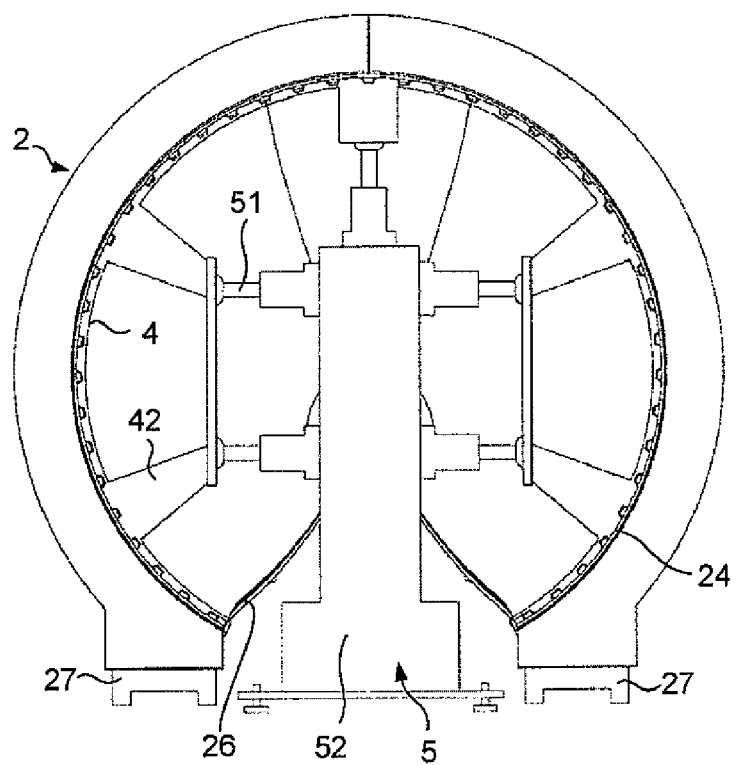
FIG. 5 shows respectively a front view of the counter-form application system positioned in the female mold; and, FIG. 6 a partial transverse cross-section view of the female mold with the skin and strengtheners inserted between the counter-form and the female mold.
Figure 6:
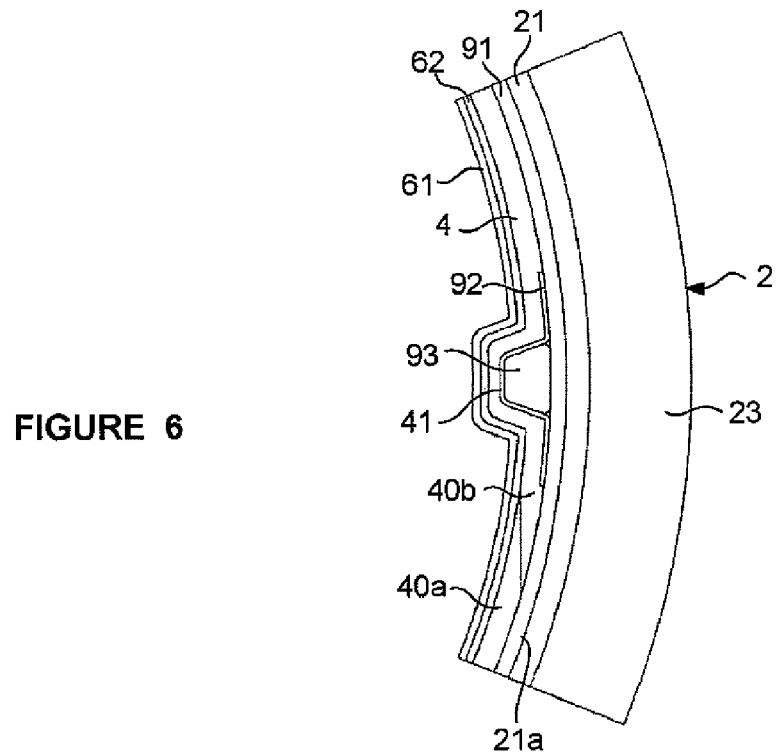

With reference to FIGS. 4 to 6, the device includes a system for the application 5 of a counter-form or counter-mold for the positioning of a counter-form 4 against the stringers 92 and the inner surface of the skin 91, so as to hold the stringers against the skin when they are assembled by simultaneous hardening and especially to guarantee a clean inner surface condition for the final section.

The counter-form 4 is formed of sheet metal complementary in shape to that of the female mold, with a rear part 4a of cylindrical shape and a front part 4b of generally truncated cone shape. The counter-form has on its outer surface longitudinal recesses 41 complementary in shape to that of the stringers. Although not shown for reasons of simplification, the front part 4b of the counter-form also includes recesses to receive stringers. As shown in FIG. 6, the counter-form is formed of sheet metal in several parts 40a, 40b with a gradual overlap between two adjacent parts.

The counter-form is placed on the application system 5 which includes a set of jacks 51 mounted along a longitudinal support 52 anchored to the ground to enable the counter-form to be deployed from a retracted position to a deployed position. The counter-form has on its inner surface longitudinal grooves 42 by which the counter-form comes to be supported against the jack rods.

After making the skin and installing the stringers in the female mold, the female mold is displaced in translation so as to be brought onto the counter-form which is in the retracted position on the application system 5, the longitudinal slit of the mold enabling the longitudinal support 52 of the application system to pass through when it is being fitted. The jacks are then actuated to flatten the counter-form against the skin and the stringers, then the counter-form is coupled to the female mold by appropriate assembly means, placed in particular in the front 25 and rear 24 openings of the female mold. The jacks are then retracted, then the female mold with the counter-form are withdrawn from the application system 5 by an reverse displacement in translation.

Before insertion into the autoclave oven 3, a vacuum cover 61 (FIG. 6) known per se, will to advantage be mounted inside the female mold against the counter-form, by inserting a drain felt 62 to facilitate vacuum formation.

The airplane fuselage will be made in at least two sections. Female molds of specific shape will be provided to make other sections of the fuselage. At least one other specific female mold of non-constant cross-section will be provided to form the rear section of the fuselage, and one or more molds of constant, overall cylindrical, transverse cross-section, will be provided to form intermediate sections. The open sections obtained using female molds according to the invention will then be coupled to each other, in a way known per se, and complementary so-called roof components will be coupled to said open sections.

In an embodiment variant, the carriage 14 or the base plate 11b of the multi-articulated arm is of transverse cross-section in the shape of a capital I, the longitudinal slit of the female mold being intended to receive the central part of the I, the lower fin of the I under the female mold and the upper fin inside the female mold. The width of the slit may thus be substantially reduced relative to the embodiment shown. The linear axis 12 is then embedded in the ground and/or the female mold is raised up relative to ground level.

Although the invention has been described in conjunction with one particular embodiment, it is quite obvious that it is in no way restricted thereto and that it includes all technical equivalents of the means described as well as combinations thereof provided they fall within the framework of the invention.

The invention claimed is:

1. A method for manufacturing a hollow component out of a composite material, the hollow component including a skin and optional strengthening elements, the method comprising:
   providing a female mold of elongated shape having a substantially continuous generally concave inner wall, the continuous wall presenting opposed edges defining a longitudinal slit extending along the length of the mold, wherein the continuous wall extends over an angular sector of about 270 degrees or more such that the longitudinal slit extends over an angular sector of about 90 degrees or less;
   inserting a multi-articulated arm fitted with a fiber placement head inside the female mold, the multi-articulated arm carried by a support received through said longitudinal slit; and
   applying fibers to an inner molding surface of the female mold using the fiber placement head to form said composite material skin, said application step being performed by displacement of the application head using the multi-articulated arm and relative displacement in translation between said support and said female mold along said longitudinal slit of the female mold.

2. The method of claim 1, wherein the support includes at least one linear rail for the support and displacement of the multi-articulated arm, the method further comprising maintaining the female mold substantially stationary and displacing the multi-articulated arm along the at least one linear rail.

3. The method of claim 2, including extending the female mold over the multi-articulated arm, the support and the at least one linear rail.

4. The method of claim 2, said linear rail supported by a ground surface, said female mold being positioned over said rail, said female mold resting on said ground surface, the opposed edges defining said longitudinal slit positioned on either side of said rail.

5. The method of claim 1, wherein the female mold includes at least one open end where said longitudinal slit emerges, the method further comprising inserting the multi-articulated arm through said open end by a relative displacement in longitudinal translation of the support relative to the female mold.

6. The method of claim 5, wherein applying fibers in order to form the composite material skin includes:
   installing strengthening elements made out of a composite material in a crude state, inside the female mold, against the skin;
   hardening the skin and strengthening elements simultaneously; and
   demolding the hollow composite material part.

7. The method of claim 6, wherein the method further includes:
   installing a male counter-form inside the female mold, against the composite material skin and strengthening elements, after installing strengthening elements; and
   holding the male counter-form substantially in place during the hardening.

8. The method of claim 7, including shifting the male counter-form from a retracted position to a deployed position.

9. The method of claim 8, including supporting the male counter form with a plurality of jack rods, the counter form defining longitudinal grooves configured to receive the jack rods.

10. The method of claim 7, including transferring the female mold into an autoclave oven to harden the skin.

11. The method of claim 10, including mounting a vacuum cover inside the female form against the counter-form before transferring the female mold into the autoclave.

12. The method of claim 11, including inserting a drain felt to facilitate vacuum formation.

13. The method of claim 6, including coupling to the skin a complementary component of composite material, in one or more parts, that is complementary in shape to the longitudinal opening of the skin, so as to form a hollow component of closed transverse cross-section.

14. The method of claim 13, including coupling the complementary component to the hardened skin after the hardening.

15. The method of claim 13, further including positioning a complementary component in a crude state at the longitudinal slit of the female mold after installing strengthening elements; and
   hardening and coupling said complementary component with the skin during hardening of the skin to obtain a closed hollow part.

16. The method of claim 6, including:
   assembling at least one complementary component of composite material to form closed sections extending over 360°, said complementary components forming the upper part of an airplane fuselage.

17. The method of claim 1, including supporting the female mold on a ground surface with first and second plates.

18. The method of claim 17, including supporting the first plate on a first guide rail and supporting the second plate on a second guide rail.

19. The method of claim 1, including forming the female mold by coupling first and second symmetrical half-molds.

20. The method of claim 1, including extending the female mold over the multi-articulated arm and the support.

21. The method of claim 1, wherein the transverse cross-section of the female mold is non-uniform.

22. The method of claim 1, wherein the continuous wall of the female mold extends over an angular sector of about 300 degrees.

* * * * *

UNITED STATES PATENT AND TRADEMARK OFFICE
CERTIFICATE OF CORRECTION

| | |
|---|---|
| PATENT NO. | : 8,057,618 B2 |
| APPLICATION NO. | : 11/740057 |
| DATED | : November 15, 2011 |
| INVENTOR(S) | : Hamlyn |

It is certified that error appears in the above-identified patent and that said Letters Patent is hereby corrected as shown below:

<u>On the Title Page, Item (73), Assignee</u>:
Delete "Lyons" and insert -- Lyon --.

<u>Column 3, Line 41</u>:
After "After the" insert -- fibers --.

Signed and Sealed this
Fourteenth Day of August, 2012

David J. Kappos
*Director of the United States Patent and Trademark Office*